K. J. THORSBY.
JOINT TIGHTENER AND SPREADER FOR CONDUITS.
APPLICATION FILED APR. 12, 1913.
1,065,408.
Patented June 24, 1913.
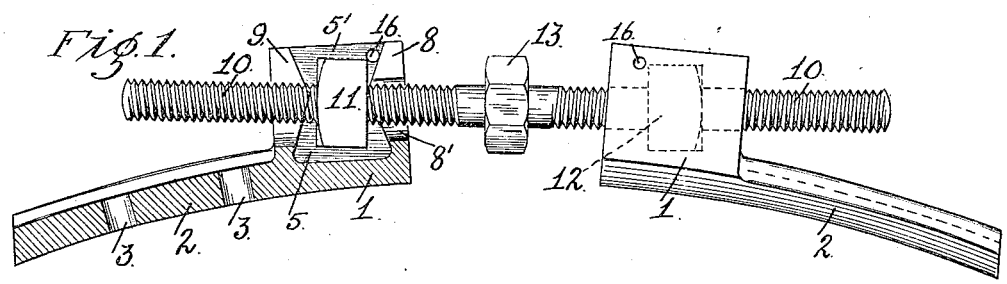
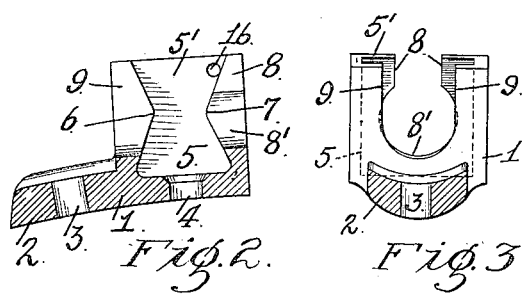 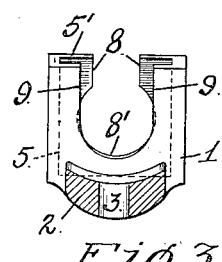 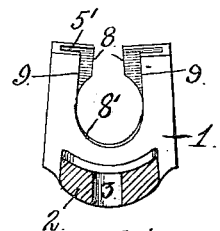
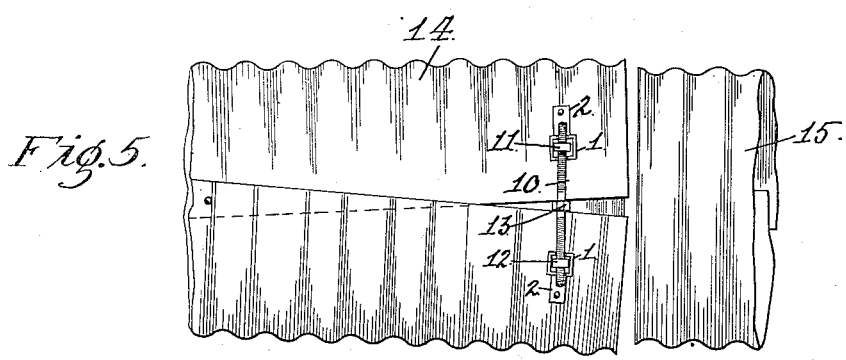
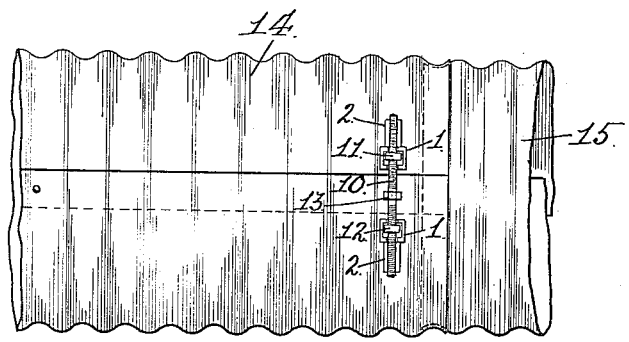
WITNESSES:
H. A. Stock
S. Constine
INVENTOR
Karl Johan Thorsby
BY
Wm. F. Booth
ATTORNEY

UNITED STATES PATENT OFFICE.

KARL JOHAN THORSBY, OF OAKLAND, CALIFORNIA, ASSIGNOR TO CALIFORNIA CORRUGATED CULVERT COMPANY, OF OAKLAND, CALIFORNIA, A CORPORATION OF CALIFORNIA.

JOINT TIGHTENER AND SPREADER FOR CONDUITS.

1,065,408. Specification of Letters Patent. Patented June 24, 1913.

Application filed April 12, 1913. Serial No. 760,747.

*To all whom it may concern:*

Be it known that I, KARL JOHAN THORSBY, a subject of the King of Norway, residing at Oakland, in the county of Alameda and State of California, have invented certain new and useful Improvements in Joint Tighteners and Spreaders for Conduits, of which the following is a specification.

My invention relates to the class of joint tighteners and spreaders for use in connection with sheet metal culverts and conduits, formed of corrugated pipes and the like.

One object is to provide a joint tightener and spreader of this class which shall be cheap, practical and efficient.

Another object is to provide such a device which by its construction will prevent any binding or undue friction on any of its members.

A still further object is to provide a device of this class which will permit the attachable members to be fastened to the pipe without first having to insert the tightening member. This is of great advantage in assembling said device.

A still further object is to provide a device of this type which will permit the placing of the tightening or spreading member in its pockets or seats in the attachable members after the pipe has been shipped and is ready for installation, thus providing for the shipping of the tightening member separately, thereby preventing any bending or destruction of the same, which sometimes occurs during transportation or rough handling of pipes.

To these ends the invention consists in the novel joint tightener and spreader which will hereafter be fully explained by referring to accompanying drawings in which—

Figure 1 is a side view partly in section of said device. Fig. 2 is a longitudinal vertical sectional view of one of the attachable members, showing a slight modification in points of its attachment. Fig. 3 is a rear end view of the member of Fig. 2, showing it ready to receive the tightening and spreading member. Fig. 4 is a rear end view of the member of Fig. 3, showing its walls bent toward each other, in order to confine the tightening and spreading member, the latter not being shown. Fig. 5 is a view showing the device attached to a pipe section, said pipe section being spread and in position to be slipped onto its adjacent pipe section. Fig. 6 is a view showing the pipe section closed and clamped tightly onto its adjacent pipe section.

1 are the attachable members of the device. They are lugs formed with shanks 2, the latter being shown in Fig. 1 as relatively long and provided with holes 3 for rivets or bolts by which said members are attached to the split pipe-section. In Fig. 2 the shank 2 is relatively short and has but one hole 3, a second hole 4 being made in the bottom of the lug. The two lugs 1 are alike, so that a description of one will answer for both.

The lug 1 is provided with a pocket 5, the front and rear walls of said pocket converging to the points 6 and 7, whence they diverge to form the pocket mouth 5' opening through the top of the lug. In the front wall of the lug from its top downward is made a slot 8, as seen in Fig. 3, said slot having its walls parallel above and terminating below in circular form, as seen at 8', which circular enlargement is sufficiently greater in diameter than that of the tightening and spreading member to give the latter a certain amount of play. This slot 8 and its enlargement 8' open, from the front, rearwardly into the pocket 5 and its mouth 5'. In the rear wall of the lug is made from its top downward a parallel sided slot 9 with a curved base, said slot opening into the pocket 5 and its mouth 5' from the rear.

10 is the tightening and spreading member. It is a bolt with right and left threads, as shown in Fig. 1. Upon this bolt are the nuts 11 and 12, and at its middle is the wrench-hold 13. In Fig. 5 is shown a split pipe-section 14 with its edges spread adapting it to receive the adjacent pipe section 15. In Fig. 6 these pipe sections 14 and 15 are shown clamped together by the tightener device.

It will now be seen that in using the device, the two lugs 1 may be initially fastened to the split pipe-section 14, and said section may be shipped without assembling the bolt 10 with said lugs, said bolt being separately shipped and thereby protected from injury. When installing the pipe, the bolt 10 is dropped down into the open upper ends of the front slot 8 and the rear slot 9. The upper portion of the front slot 8 is just wide enough to receive the bolt 10, but the rear slot is sufficiently wider than the bolt to permit the latter to swing freely after the upper end of the slot 8 is closed, as will be described presently, and the enlargement 8' of slot 8 is also large enough to give the bolt free play. The two nuts 11 and 12 pass down into the wide open pocket mouth 5' and the pocket 5 and they bear on either point 6 or 7 of said pocket, as the case may be, in tightening up or in spreading, and this bearing is such as to reduce frictional binding to a minimum. When the bolt 10 is in place, it is held in its seat by diminishing the effective width of the front slot 8. This is best done by forcing the walls of the slot toward each other sufficiently, as shown in Fig. 4, or the bolt may be held in place by a nail or pin passed through a hole 16 in the side walls of the pocket mouth 5'.

The device being assembled, the bolt 10 is operated by the use of a wrench on the wrench-hold 13 and the split pipe-section 14 either tightened up to clamp the section 15, or spread to receive said section 15 or to release said section as the case may be. The convergence of the pocket walls to the points 6 and 7 gives another advantage, namely, the lugs 1 can be applied to pipes of different diameters, because in every case the nuts 11 and 12 will bear at their middle on said points and act as rockers, preventing any binding on the nuts or on the bolt 10, the stresses acting on the center line of said bolt.

I claim:—

1. A tightening and spreading device of the described class, comprising a pair of lugs provided with means for attaching them to the pipe-section, each of said lugs being formed with a pocket opening downward from its top, the front wall of said lug being formed with a slot opening downward from its top and communicating with the pocket, said slot having a width above to receive the tightening and spreading bolt and an enlarged base, and the back wall of said lug having a slot opening downward from its top and communicating with the pocket, said slot having a width to allow the bolt free play therein; a right and left threaded bolt adapted to enter and seat itself in said slots; and nuts on said bolt seated in the pockets of said lugs.

2. A tightening and spreading device of the described class, comprising a pair of lugs provided with means for attaching them to the pipe-section, each of said lugs being formed with a pocket opening downward from its top, the front wall of said lug being formed with a slot opening downward from its top and communicating with the pocket, said slot having a width above to receive the tightening and spreading bolt and an enlarged base, and the back wall of said lug having a slot opening downward from its top and communicating with the pocket, said slot having a width to allow the bolt free play therein; a right and left threaded bolt adapted to enter and seat itself in said slots; nuts on said bolt seated in the pockets of said lugs; and means for confining the bolt in the lugs.

3. A tightening and spreading device of the described class, comprising a pair of lugs provided with means for attaching them to the pipe-section, each of said lugs being formed with a pocket opening downward from its top, said pocket having a lower portion the front and rear walls of which converge upwardly and an upper mouth portion the front and rear walls of which converge downwardly whereby bearing points are formed in said pocket, said lug having its front wall formed with a slot opening downward from its top and communicating with the pocket, said slot having a width above to receive the tightening and spreading bolt and an enlarged base, and the back wall of said lug having a slot opening downward from its top and communicating with the pocket, said slot having a width to allow the bolt free play therein; a right and left threaded bolt adapted to enter and seat itself in said slots; and nuts on said bolt seated in the pockets of said lugs.

4. A tightening and spreading device of the described class, comprising a pair of lugs provided with means for attaching them to the pipe-section, each of said lugs being formed with a pocket opening downward from its top, said pocket having a lower portion the front and rear walls of which converge upwardly and an upper mouth portion the front and rear walls of which converge downwardly whereby bearing points are formed in said pocket, said lug having its front wall formed with a slot opening downward from its top and communicating with the pocket, said slot having a width above to receive the tightening and spreading bolt and an enlarged base, and the back wall of said lug having a slot opening downward from its top and communicating with the pocket, said slot having a width to allow the bolt free play therein; a right and left threaded bolt adapted to enter and seat itself in said slots; nuts on said bolt seated in the pockets of said lugs; and means for confining the bolt in the lugs.

5. A tightening and spreading device of the described class, comprising a pair of lugs provided with means for attaching them to the pipe-section, each of said lugs being formed with a pocket opening downward from its top, said pocket having a lower portion the front and rear walls of which converge upwardly and an upper mouth portion the front and rear walls of which converge downwardly whereby bearing points are formed in said pocket, and said lug having openings in its front and rear walls communicating with said pocket; a right and left threaded bolt seated in said openings; and nuts on said bolt seated in the pockets of the lugs.

6. A tightening and spreading device of the described class, comprising a pair of lugs provided with means for attaching them to the pipe-section, each of said lugs being formed with a pocket opening downward from its top, said pocket having a lower portion the front and rear walls of which converge upwardly and an upper mouth portion the front and rear walls of which converge downwardly whereby bearing points are formed in said pocket, and said lug having openings in its front and rear walls communicating with said pocket; a right and left threaded bolt seated in said openings; nuts on said bolt seated in the pockets of the lugs; and means for confining the bolt in the lugs.

In testimony whereof I have signed my name to this specification in the presence of two subscribing witnesses.

KARL JOHAN THORSBY.

Witnesses:
  B. G. MARSHALL,
  C. R. HODGKIN.